(12) United States Patent
Neder et al.

(10) Patent No.: US 6,227,713 B1
(45) Date of Patent: May 8, 2001

(54) TAPERED ROLLER BEARING FOR WORKING ROLLS OF ROLL STRANDS

(75) Inventors: Günter Neder, Schweinfurt; Thomas Peuschel, Marktsteinach; Manfred Schultheiss, Schweinfurt; Alfred Schwappach, Bundorf, all of (DE)

(73) Assignee: SKF GmbH, Schweinfurt (DE)

( * ) Notice: Subject to any disclaimer, the term of this patent is extended or adjusted under 35 U.S.C. 154(b) by 0 days.

(21) Appl. No.: 09/037,687

(22) Filed: Mar. 10, 1998

(30) Foreign Application Priority Data

Mar. 11, 1997 (DE) .......................................... 297 04 386 U

(51) Int. Cl.⁷ .................................................... F16C 33/78
(52) U.S. Cl. ........................ 384/484; 384/475; 384/486; 384/569; 384/571
(58) Field of Search ..................... 384/484, 486, 384/571, 569, 564, 462, 463, 475, 907

(56) References Cited

U.S. PATENT DOCUMENTS

| | | | |
|---|---|---|---|
| 4,692,040 | * 9/1987 | Ebaugh et al. | 384/484 |
| 4,997,294 | * 3/1991 | Hillmann | 384/484 |
| 5,362,159 | 11/1994 | Küfner et al. | 384/484 |
| 5,642,946 | * 7/1997 | Caillault et al. | 384/486 |

FOREIGN PATENT DOCUMENTS

| | | |
|---|---|---|
| 42 06 764 | 9/1993 | (DE) . |
| 2 262 785 | 6/1993 | (GB) . |
| 2 264 757 | 9/1993 | (GB) . |

* cited by examiner

*Primary Examiner*—Thomas R. Hannon
(74) *Attorney, Agent, or Firm*—Burns, Doane, Swecker & Mathis, L.L.P.

(57) ABSTRACT

A four-row tapered roller bearing for working rolls of roll stands includes a plurality of axially arranged inner ring parts forming an inner ring, a plurality of axially arranged outer ring parts forming an outer ring, and four annular rows of tapered rolls positioned between the inner and outer ring parts. Each inner ring part has an inner extension with the inner extensions possessing end faces that are directly positioned against one another along a partition groove. The end face of at least one of the inner extensions is provided with a plurality of spaced apart and radially extending grooves in which is received lubricant to lubricate said end faces of the inner extensions. An annular sealing ring encircles the outer surfaces of the inner extensions of the inner ring parts and have a pair of inwardly directed ribs which engage the outer surface of the inner extensions to form between the ribs and the outer surfaces of the inner extensions a closed chamber which bridges the partition groove.

19 Claims, 1 Drawing Sheet

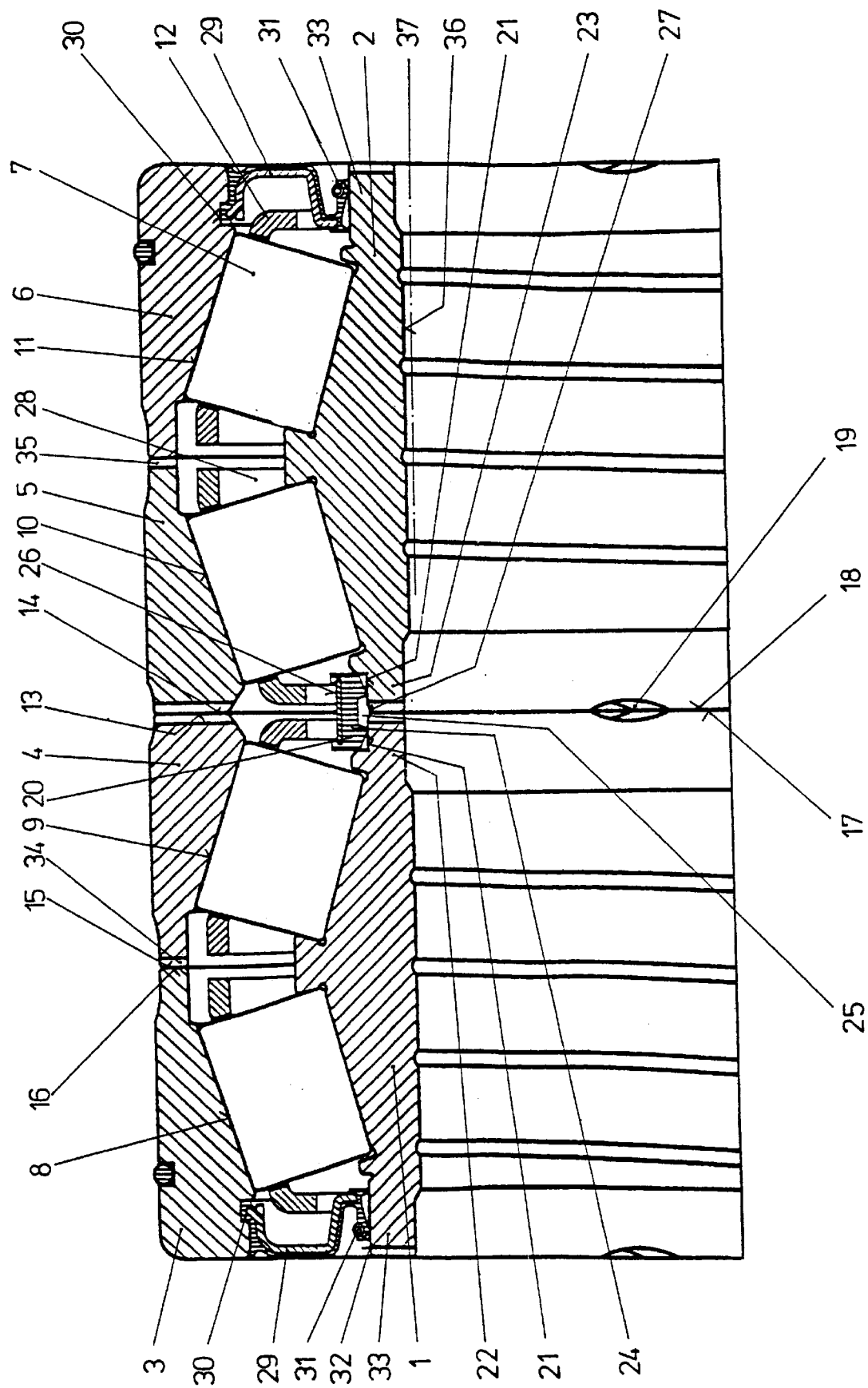

TAPERED ROLLER BEARING FOR WORKING ROLLS OF ROLL STRANDS

The present application claims priority under 35 U.S.C. § 119 with respect to German Application No. G 297 04 386.2, the entire content of which is incorporated herein by reference.

FIELD OF THE INVENTION

The present invention generally relates to a roller bearing. More particularly, the present invention pertains to four-row tapered roll bearing for working rolls of roll stands.

BACKGROUND OF THE INVENTION

A known type of four-row tapered roller bearing for working rolls of roll stands is disclosed in DE-OS 42 06 764, which corresponds to U.S. Pat. No. 5,362,159. This roller bearing is constructed of axially multi-part inner and outer rings, with tapered rollers provided between the bearing rings. A partition groove is provided between the end faces of the inner rings that face each other and are directly positioned against each other. The partition groove is sealed by a sealing ring which is provided in its bore with peripheral ribs resting on the mantle surfaces of the inner rings. Between the ribs and the area of the inner ring mantle surfaces located between the ribs is formed a chamber which bridges the partition groove and is designed to hold lubricant.

This known design is intended solely for a specific application under specific operating conditions, e.g. lubrication, which means that several different versions of the roller bearing must be manufactured and kept in stock for the various possible operating conditions. This entails significant costs. This known roller bearing also brings with it the risk that wear may occur between the inner ring halves that experience movement relative to each other. This results at least in part because the heat elimination from the bearing inside is also not always sufficient.

A need thus exists for a tapered roller bearing that can be used universally for different applications, and in particular for different types of lubrication, A need also exists for a tapered roller bearing that ensures low wear as well as good heat elimination.

SUMMARY OF THE INVENTION

In light of the foregoing, the present invention provides a four-row tapered roller bearing for working rolls of roll stands that includes a plurality of axially arranged inner ring parts forming an inner ring, a plurality of axially arranged outer ring parts forming an outer ring, and four annular rows of tapered rolls positioned between the inner and outer ring parts. Each inner ring part has an inside extension with the inside extensions possessing end faces that are directly positioned against one another along a partition groove. The end face of at least one of the inside extensions is provided with a plurality of spaced apart and radially extending grooves in which is received lubricant to lubricate said end faces of the inside extensions. An annular sealing ring encircles the outer surfaces of the inside extensions of the inner ring parts and have a pair of inwardly directed ribs which engage the outer surface of the inside extensions to form between the ribs and the outer surfaces of the inside extensions a closed chamber which bridges the partition groove.

With this construction, it is possible to use the tapered roller bearing according to the invention in a variety of different ways. It is possible to eliminate the heat generated in the bearing through the grooves in the end faces of the inner ring parts facing each other. The grooves may be used for the passage or additional collection of lubricants which can be used for lubricating the end faces of the inner ring parts which perform relative movements during operation. A suitable lubricating grease or an oil stored in a cushion of porous material, or a solid lubricant can be used as the lubricant.

The lubricant can also be located in the chamber formed by the sealing ring bridging the partition groove. The sealing ring prevents the abrasion generated by the relative movement between the inner ring parts relative to each other or to the roll pins, or other contaminations, from reaching the inside of the bearing. The sealing ring can also be provided with a valve that opens in the presence of overpressure inside the bearing so that during lubrication of the bearing with oil vapor or oil mist, the grooves can function as ventilation or pressure compensation bores. In this way, additional heating of the bearing is prevented. Also, lubricant which escapes during overpressure provides a lubricant film between the end faces of the inner ring parts positioned against each other and between the bore of the inner ring parts and the roll pin when the bearing is seated loosely on the roll pin, thus reducing wear.

According to another aspect of the invention, a four-row tapered roller bearing includes a pair of axially arranged inner ring parts which together define an inner ring, a plurality of axially arranged outer ring parts which together define an outer ring, and four annular rows of tapered rolls positioned between the inner and outer rings. The inner ring parts have end faces that are directly positioned against one another at a partition groove. The end face of at least one of the inner ring parts is provided with circumferentially spaced apart grooves. A seal contacts the outer surfaces of the inner ring parts to define a closed chamber which bridges the partition gap.

Another aspect of the present invention involves a tapered roller bearing defined by a plurality of axially arranged inner ring parts in which a partition groove between end faces of the inner ring parts that are positioned in facing relation to one another is sealed by a seal that together with outer surfaces of the inner ring parts defines a chamber. The end face of at least one of the inner ring parts is provided with a plurality of spaced apart grooves. A plurality of axially arranged outer ring parts are positioned radially outwardly of the inner ring parts, and several rows of tapered rollers are disposed between the inner ring parts and the outer ring parts.

BRIEF DESCRIPTION OF THE DRAWING FIGURE

The foregoing and additional features of the present invention will become more apparent from the following detailed description considered with reference to the accompanying drawing figure which is a longitudinal cross-sectional view of the roller bearing of the present invention.

DETAILED DESCRIPTION OF THE INVENTION

The sealed, four-row tapered roller bearing of the present invention can be used as a working roller bearing for roll stands, primarily for hot and cold band trains. As seen with reference to the drawing figure, the tapered roller bearing includes two inner ring parts 1, 2, four outer ring parts 3, 4, 5, 6, and a plurality of tapered rollers arranged in four annular rows 8, 9, 10, 11. Each of the inner ring parts 1, 2 includes a pair of spaced apart races while each of the outer ring parts 3, 4, 5, 6 includes a single race. The tapered rollers 7 of each roller row 8, 9, 10, 11 are arranged between the races of the inner ring parts 1, 2 and those of the outer ring parts 3, 4, 5, 6. In addition, the tapered rollers 7 of each roller row 8, 9, 10, 11 are held and guided inside a cage 12.

The axially innermost outer ring parts 4, 5 are positioned directly against each other so that the end face of one outer ring part 4 faces the end face of the other outer ring part 5. The end faces 15 of the axially innermost outer ring parts 4, 5 which face away from each other are positioned directly on the end faces 16 of the axially outermost outer ring parts 3, 6. The inner ring parts 1, 2 are also positioned directly against each other so that their axially inwardly located end faces 17, 18 face one another.

The inner ring parts 1, 2 are provided with inner ring extensions 22, 23 located in the center of the bearing. The inner ring extensions 22, 23 are located on the axially inwardly facing ends of the inner ring parts 1, 2 so that the inner ring extension 22, 23 on each inner ring part 1, 2 extends axially towards the other inner ring part 1, 2. The inner ring extensions 22, 23 each possess a cylindrical outer surface 21. Each of the inner ring parts 1, 2 is also provided with an outer ring extensions 33. These outer ring extensions 33 are located at the axially opposite end of the inner ring parts 1, 2 from the inner ring extensions 22, 23.

The end faces 17, 18 of the inner ring parts 1, 2 (i.e., the end faces of the inner ring extensions 22, 23) that face each other are provided with grooves 19. The grooves 19 extend in the radial direction and are distributed circumferentially about the end faces 17, 18. The grooves 19 on the end faces 17, 18 can be positioned in facing relation to one another as seen in the drawing figure. Alternatively, the grooves 19 can be circumferentially offset from one another. Further, while the illustrated preferred embodiment includes grooves 19 located on both end faces 17, 18 of the inner ring parts 1, 2, grooves 19 can be provided on only one of the end faces 17, 18.

An annular sealing ring 20 is provided to seal the partition groove between the end faces 17, 18 of the inner rings 1, 2. The sealing ring 20, which can be made of rubber or plastic for example, is arranged and centered on the cylindrical outer surfaces 21 of the inner ring extensions 22, 23 in the center of the bearing. The inner surface of the bore in the annular sealing ring 20 is provided with radially inwardly directed ribs 24 which rest on the axially extending cylindrical outer surfaces 21 of the inner ring parts 1, 2 (i.e., the outer surfaces of the inner ring extensions 22, 23). The ribs 24 thus form with the inner ring parts 1, 2 a closed chamber 25 that bridges the partition groove. The closed chamber 25 communicates with the grooves 19. Although the illustrated embodiment of the roller bearing includes a single annular closed chamber 25, it is to be understood that the chamber 25 could be divided into several chamber segments by providing one or more wall portions or the like. The sealing ring 20 is provided with an integrated end ring 26 that can be made of metal, for example.

As seen in the drawing figure, the inner ring extensions 22, 23 are provided with bevels 27 on the sides facing each other. That is, the bevels 27 are provided at the radially outwardly located corner of each inner ring extension 22, 23 (i.e., the corner facing towards the chamber 25). The bevels 27 allow the sealing ring 20 to be pushed onto the inner ring extension 22 of one of the inner ring parts 1 during assembly of the bearing. The sealing ring 20 can then be centered and thereafter the inner ring extension 23 of the other inner ring part 2 can be easily inserted into the bore of the sealing ring 20.

The roller bearing includes a bearing space 28 that is sealed axially outwardly by sealing rings 29 positioned at opposite ends of the roller bearing. The sealing rings 29 are arranged in annular grooves 30 in the bore of the axially outermost outer ring parts 3, 6. The sealing rings 29 each include a sealing lip 31 that extends along the cylindrical outer surface 32 of the outer ring extensions 33. Instead of, or in addition to, the circumferential arrangement of radial grooves 19 on the inner ring parts 1, 2, the outer ring parts 4, 5 may be provided with corresponding openings 34, 35 for relubricating and ventilating the roller bearing.

The radial grooves 19 and/or the chamber 25 is filled with lubricant. This advantageously lubricates the inner ring surfaces 17, 18 that rotate against each other during operation and/or lubricates the gap between the bores 36 of the inner ring parts 1, 2 and the roll pin 37 which is generally depicted in the drawing figure. The lubricant also tightly seals the bearing space 28 from the direction of the roll pin 37. The grooves 19 and the chambers 25 are also able to hold and collect any abrasion material from the roll pin 37 and/or the end faces 17, 18 of the inner ring parts 1, 2. The lubricant may be a lubricating grease, an oil stored in a cushion of a porous material, e.g. plastic (referred to as a "solid oil"), or a solid lubricant.

The sealing ring 20 that seals the bearing space 28 can be provided with an overpressure valve or similar device that opens when the bearing space 28 is lubricated with oil vapor or oil mist in the presence of a specific overpressure, thus ventilating the bearing space 28 and compensating for pressure differentials. Hereby oil can be carried along into the chambers 25 and the grooves 19, and can be used for lubricating the end faces 17, 18 of the inner ring parts 1, 2 and/or the gap between the inner ring bore 36 and the roll pin 37. In these cases, the chamber 25 and the grooves 19 should not be filled completely with lubricant.

Instead of, or in addition to, the lubricant(s), inserts of a material with good thermal conductivity properties can be inserted into the grooves 19 and possibly also into the chamber 25. Inserts of such material can facilitate elimination of the heat from the bearing space 28 and the inner ring parts 1, 2 into the roll pin 37.

By virtue of the construction of the tapered roller bearing of the present invention, the tapered roller bearing is useful in a wide variety of applications and operating conditions, and can be used with a wide variety of different lubrications. In addition, the tapered roller bearing is well suited to facilitating heat elimination and improving the wear characteristics of the bearing.

The principles, a preferred embodiment and the mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A four-row tapered roller bearing for working rolls of roll stands comprising:

a plurality of axially arranged inner ring parts forming an inner ring, each inner ring part having an inside extension with the inside extensions possessing end faces that are directly positioned against one another along a partition groove, each inside extension having an outer surface, said end face of at least one of the inside extensions being provided with a plurality of spaced apart and radially extending grooves in which is received lubricant to lubricate said end faces of the inside extensions;

a plurality of axially arranged outer ring parts forming an outer ring;

four annular rows of tapered rolls positioned between the inner and outer rings;

an annular sealing ring encircling the outer surface of the inside extensions of the inner ring parts and having a pair of inwardly directed ribs which engage the outer surface of the inside extensions to form between the ribs and the outer surfaces of the inside extensions a closed chamber which bridges the partition groove.

2. The four-row tapered roller bearing according to claim 1, wherein the chamber contains lubricant.

3. The four-row tapered roller bearing according to claim 1, including a sealing ring provided between the inner and outer rings at each axial outer end.

4. The four-row tapered roller bearing according to claim 3, wherein the lubricant in the grooves and the chamber is an oil saturated cushion of a porous material.

5. The four-row tapered roller bearing according to claim 3, wherein the lubricant in the grooves and the chamber is a solid lubricant.

6. The four-row tapered roller bearing according to claim 1, wherein the lubricant in the grooves is an oil saturated cushion of a porous material.

7. The four-row tapered roller bearing according to claim 1, wherein the lubricant in the grooves is a solid lubricant.

8. A four-row tapered roller bearing comprising:

a pair of axially arranged inner ring parts which together define an inner ring, the inner ring parts each having an outer surface, the inner ring parts having end faces that are directly positioned against one another at a partition groove, the end face of at least one of the inner ring parts being provided with circumferentially spaced apart grooves;

a plurality of axially arranged outer ring parts which together define an outer ring;

four annular rows of tapered rolls positioned between the inner and outer rings;

a seal contacting the outer surfaces of the inner ring parts to define a closed chamber which bridges the partition gap.

9. The four-row tapered roller bearing according to claim 8, wherein at least one of chamber and the grooves contain a lubricant.

10. The four-row tapered roller bearing according to claim 9, wherein the lubricant is an oil saturated cushion of a porous material.

11. The four-row tapered roller bearing according to claim 9, wherein the lubricant is a solid lubricant.

12. The four-two tapered roller bearing according to claim 8, wherein the grooves and the chamber contain lubricant.

13. The four-row tapered roller bearing according to claim 12, wherein the lubricant is an oil saturated cushion of a porous material.

14. The four-row tapered roller bearing according to claim 12, wherein the lubricant is a solid lubricant.

15. The four row tapered roller bearing according to claim 8, wherein the seal is an annular seal having two spaced apart and radially inwardly extending ribs which engage the outer surfaces of the inner ring parts.

16. A tapered roller bearing comprising a plurality of axially arranged inner ring parts in which a partition groove between end faces of the inner ring parts that are positioned in facing relation to one another is sealed by a seal that together with outer surfaces of the inner ring parts defines a chamber, the end face of at least one of the inner ring parts being provided with a plurality of spaced apart grooves, a plurality of axially arranged outer ring parts positioned radially outwardly of the inner ring parts, and a plurality of rows of tapered rollers provided between the inner ring parts and the outer ring parts.

17. The tapered roller bearing according to claim 16, wherein at least one of the chamber and the grooves contain a solid lubricant.

18. The tapered roller bearing according to claim 16, wherein the grooves contain a lubricant.

19. The tapered roller bearing according to claim 16, wherein at least one of the chamber and the grooves contain a lubricant in the form of an oil saturated cushion of porous material.

* * * * *